US010056861B2

(12) United States Patent
Sauerzapf

(10) Patent No.: US 10,056,861 B2
(45) Date of Patent: Aug. 21, 2018

(54) JUNCTION BOX HOUSING FOR A PHOTOVOLTAIC PANEL HAVING HOUSING PARTS ADJUSTABLE TO ACCOMMODATE A THICKNESS OF THE PHOTOVOLTAIN PANEL

(71) Applicant: Stäubli Electrical Connectors AG, Allschwil (CH)

(72) Inventor: Holger Roland Sauerzapf, Essen (DE)

(73) Assignee: Stäubli Electrical Connectors AG, Allschwil (CH)

( * ) Notice: Subject to any disclaimer, the term of this patent is extended or adjusted under 35 U.S.C. 154(b) by 0 days.

(21) Appl. No.: 15/328,793

(22) PCT Filed: Jul. 16, 2015

(86) PCT No.: PCT/EP2015/066304
§ 371 (c)(1),
(2) Date: Apr. 24, 2017

(87) PCT Pub. No.: WO2016/012344
PCT Pub. Date: Jan. 28, 2016

(65) Prior Publication Data
US 2017/0237392 A1    Aug. 17, 2017

(30) Foreign Application Priority Data

Jul. 25, 2014 (EP) ..................................... 14178576

(51) Int. Cl.
*H01R 13/60* (2006.01)
*H02S 40/34* (2014.01)
(Continued)

(52) U.S. Cl.
CPC ....... *H02S 40/345* (2014.12); *H01R 13/6395* (2013.01); *H02G 3/081* (2013.01)

(58) Field of Classification Search
CPC .... H01R 13/60; H01R 13/66; H01R 13/6395; H01R 24/78; H01R 24/525; H01R 25/006;
(Continued)

(56) References Cited

U.S. PATENT DOCUMENTS 6,066,796 A    5/2000  Itoyama et al.
2009/0114261 A1*  5/2009  Stancel ................... H01L 31/05
                                                            136/244
(Continued)

FOREIGN PATENT DOCUMENTS

DE    102010024350 A1    12/2011
WO    2008150558 A1    12/2008
WO    2009058231 A1    5/2009

*Primary Examiner* — Chandrika Prasad
(74) *Attorney, Agent, or Firm* — The Webb Law Firm

(57) ABSTRACT

A junction box housing (3) for a photovoltaic panel (4) comprises first and second housing parts (1, 2). The first housing part (1) has a first contact surface (5) for direct or indirect arrangement on a surface (7) of the photovoltaic panel (4). The second housing part (2) has a second contact surface (6) for direct or indirect arrangement on the other surface (8) of the photovoltaic panel (4). The first contact surface (5) is spaced apart from the second contact surface (6) so that a slot (9) for receiving the photovoltaic panel (4) is provided by the first contact surface (5) and the second contact surface (6). The two housing parts (1, 2) are connected to each other via at least one guide (10) and are designed to be displaceable relative to one another along an assembly movement (M) so that the thickness (D) of the slot (9) is adjustable.

20 Claims, 6 Drawing Sheets

(51) Int. Cl.
*H02G 3/08* (2006.01)
*H01R 13/639* (2006.01)

(58) Field of Classification Search
CPC .......... H02G 3/081; H02G 3/086; H02G 3/10; H02G 3/14; H02G 3/18; H02G 3/20; H02S 40/345
USPC .................. 439/76.1, 76.2, 211, 535; 174/53
See application file for complete search history.

(56) References Cited

U.S. PATENT DOCUMENTS

| | | | |
|---|---|---|---|
| 2011/0108085 A1* | 5/2011 | Quiter | H01L 31/02013 136/244 |
| 2013/0081338 A1 | 4/2013 | Sagdic et al. | |
| 2013/0276856 A1* | 10/2013 | Mills | H01R 13/6641 136/244 |
| 2016/0380586 A1* | 12/2016 | Mostoller | H02S 40/34 174/520 |
| 2017/0040938 A1* | 2/2017 | Zhong | H01L 31/0201 |

* cited by examiner

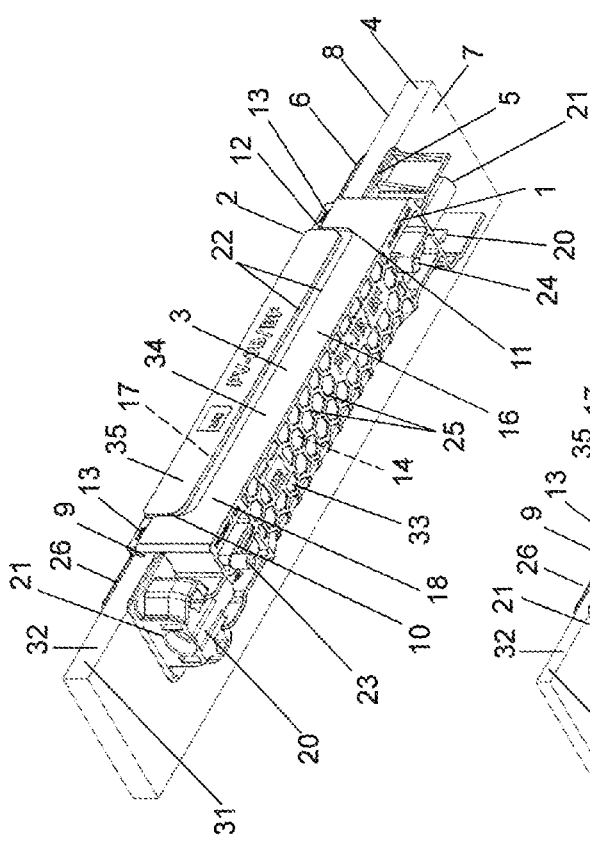
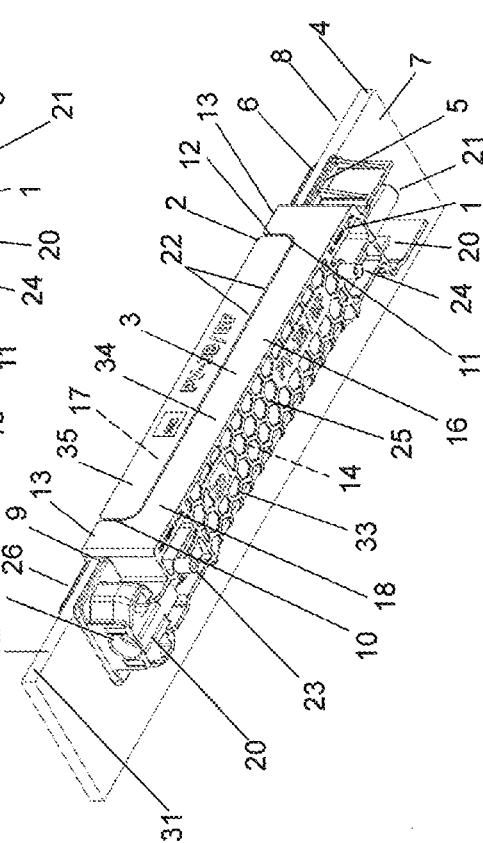
FIG. 1
FIG. 2

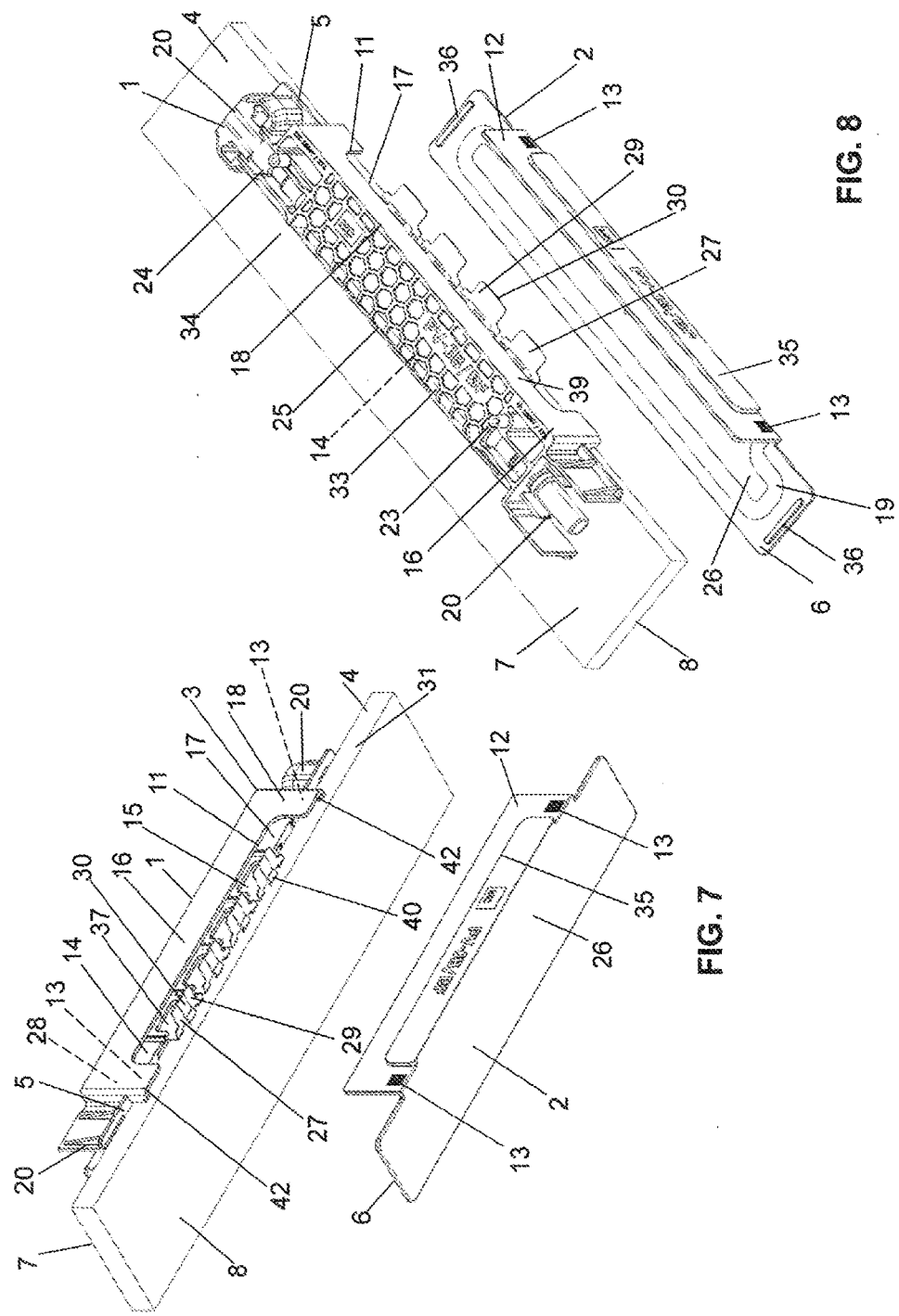

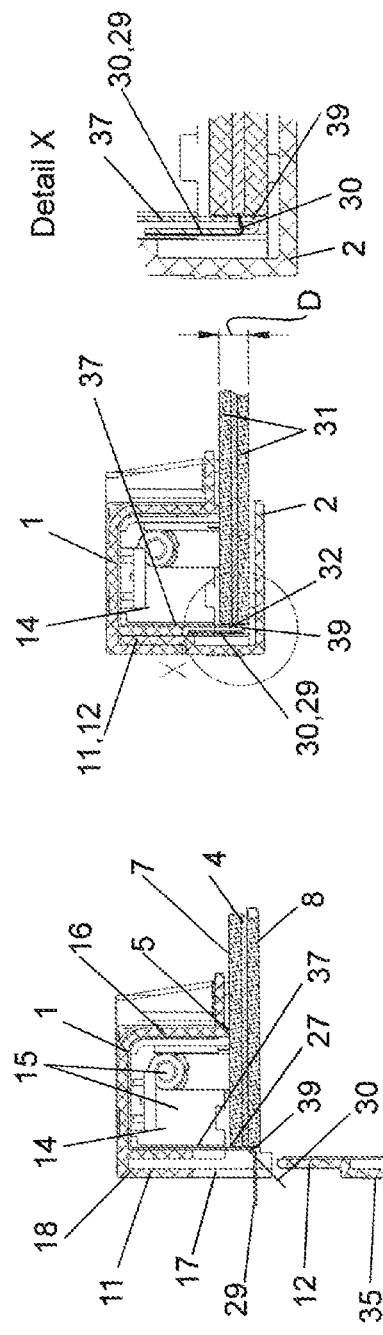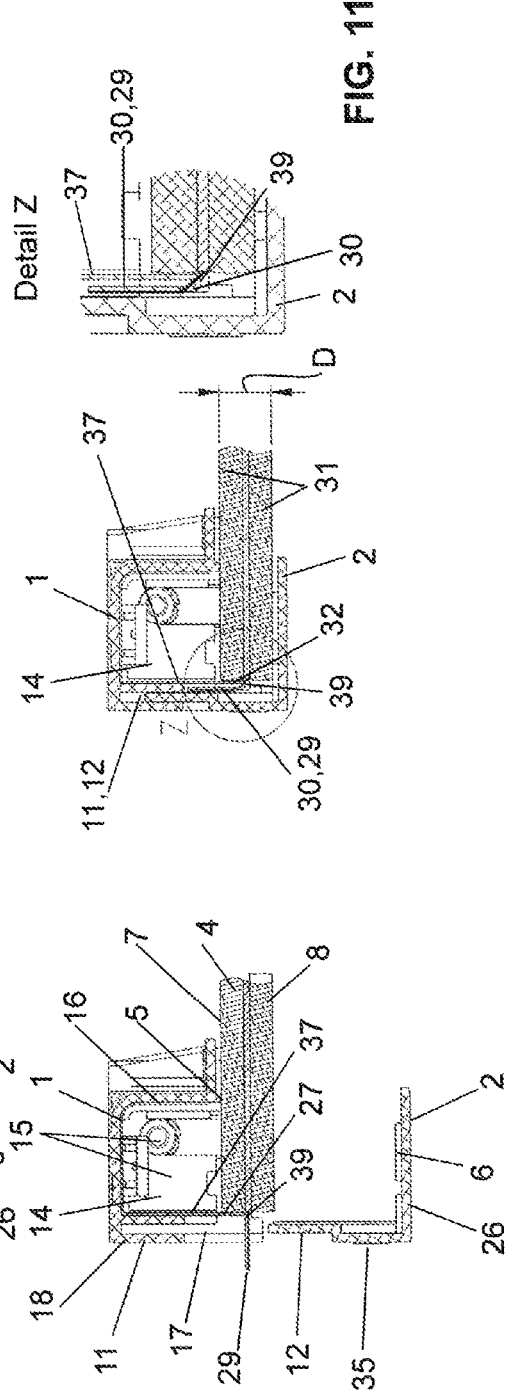

JUNCTION BOX HOUSING FOR A PHOTOVOLTAIC PANEL HAVING HOUSING PARTS ADJUSTABLE TO ACCOMMODATE A THICKNESS OF THE PHOTOVOLTAIN PANEL

CROSS-REFERENCE TO RELATED APPLICATIONS

This application is the United States national phase of International Application No. PCT/EP2015/066304 filed Jul. 16, 2015, and claims priority to European Patent Application No. 14178576.6 filed Jul. 25, 2014, the disclosures of which are hereby incorporated in their entirety by reference.

BACKGROUND OF THE INVENTION

Field of the Invention

The present invention relates to a junction box for a photovoltaic module.

Description of Related Art

Junction boxes for photovoltaic modules are known from the prior art. Such junction boxes serve to accommodate a bypass diode, such that, in the case of a solar cell, or photovoltaic panels, being partially switched off, the problems associated therewith can be prevented.

Junction boxes that can be placed in the region of the side edges of a photovoltaic module have become known from the prior art. For example, WO 2009/058231 discloses such a junction box. The junction box according to WO 2009/058231 can be disposed on differing photovoltaic modules of differing thickness. For this purpose, a variety of junction box covers are provided, which represents a disadvantage in respect of numerous aspects, in particular in respect of costs and stock holding. Moreover, it is also not possible to compensate tolerances in the thickness of the photovoltaic module.

SUMMARY OF THE INVENTION

Proceeding from the prior art, the invention is based on an object of specifying a junction box housing that overcomes the disadvantages of the prior art. In particular, a junction box housing that is advantageous in respect of stock holding and costs is to be specified. Further, it is an object of the present invention to specify a junction box housing that can be used in a flexible manner.

This object is achieved by the junction box housing for a photovoltaic panel comprising a first housing part and a second housing part, wherein the first housing part has a first contact face by means of which the first housing part can be disposed directly or indirectly on a surface of the photovoltaic panel, and wherein the second housing part has a second contact face by means of which the second housing part can be disposed directly or indirectly on the other surface of the photovoltaic panel. In other words, the respective contact faces are in direct or indirect contact with the corresponding surface. The first contact face is spaced apart from the second contact face, such that a slot for receiving the photovoltaic panel is provided by the first contact face and the second contact face. The photovoltaic panel projects into this slot, or the junction box housing surrounds a portion of the photovoltaic panel by means of the slot. The two housing parts are connected to each other via at least one guide, and are designed to be displaceable relative to each other, guided by the guide, along an assembly movement, such that the thickness of the slot is adjustable.

The thickness of the slot can thus be adapted to the thickness of the photovoltaic panel. This enables the junction box housing to be mounted on photovoltaic panels of differing thickness. The junction box housing can thus be used universally, in respect of the thickness, on differing types of photovoltaic panel, which, for stock holding, means that it is no longer necessary for a particular housing to be held in stock for each panel type. Furthermore, the junction box housing can be mounted in a flexible manner, because the junction box housing can be adjusted with a precise fit to the thickness of the photovoltaic panel. Moreover, tolerances in the thicknesses of the photovoltaic panel can easily be compensated.

The guide is preferably an integral constituent part of the respective housing parts. A part of the guide in this case is assigned to the first housing part, and another part is assigned to the second housing part. In the assembled state, the guide is preferably outside of the photovoltaic panel, in particular outside of the lateral faces of the photovoltaic module.

As a result of two surfaces of the photovoltaic panel being contacted by the said contact faces, parts of the photovoltaic panel are clamped in the junction box housing. As viewed from the side, the junction box housing is preferably realized in the manner of a clamp, and surrounds the photovoltaic panel.

The slot preferably has a thickness in the range of from 2 to 10 millimeters. The thickness of the slot is defined as the distance between the two contact faces in a direction at right angles to the contact faces. The bottom of the slot, which is provided by parts of the first housing part and/or parts of the second housing part, bears against the lateral face of the photovoltaic panel. In other words, the bottom of the slot can be disposed on the lateral face of the photovoltaic panel, or the lateral face of the photovoltaic panel can be contacted to the bottom of the slot.

In the case of indirect contacting, the contact faces bear against the respective surface via a further element such as, for example, a sealing compound, or a spacing element that extends from the contact face. In the case of direct contacting, the contact faces bear directly against the respective surface.

The two contact faces extend preferably parallel to each other.

Preferably, the assembly movement is inclined at an angle, in particular at right angles, to the said contact faces, or the said surfaces.

Preferably, the guide comprises at least one guide receiver, disposed on one of the housing parts, and at least one guide element, disposed on the other of the housing parts. The guide element projects into the guide receiver and is mounted in the latter so as to be displaceable along the assembly direction.

The guide, or the guide receiver, and the guide element are preferably disposed on lateral boundary regions of the contact faces, such that, in the installation position, the guide is located outside of the photovoltaic panel, in the vicinity to the lateral edges.

Particularly preferably, the guide receiver and the guide element are inclined at an angle, in particular at right angles, to the respective contact face.

The guide receiver may be realized in various ways. Preferably, the guide receiver comprises at least one guide face, with which the guide element is in contact and relative to which it can be moved. In another embodiment, the guide receiver comprises at least two or at least three guide faces. The guide face may be of a flat or curved design.

Preferably, the housing parts, in particular in the region of the guide, have latching elements that act in combination with each other. Particularly preferably, a plurality of latching elements are disposed such that they are spaced apart in relation to one another, in particular with regular spacings. Owing to the latching elements, on the one hand a mechanical connection can be provided between the two housing parts, and on the other hand the assembly movement can be effected in controlled movement steps.

Preferably, the first housing part comprises an interior space, delimited by a wall, for receiving functional elements, wherein the wall provides the first contact face and has an access opening in the region of the first contact face. An electrical contact between the functional elements and the photovoltaic panel can be made through the access opening.

Particularly preferably, the access opening extends into a wall disposed adjacently to the first contact face. The degree of freedom in assembly is thereby increased.

Particularly preferably, the parts of the access opening in the plane of the first contact face are oriented in the installation position in relation to the surface of the photovoltaic panel. The parts of the access opening in the adjacent wall are preferably at right angles to the parts of the access opening in the plane. The parts of the access opening in the adjacent wall are closed off by the second housing part.

Preferably, the guide is disposed in the region of the access opening in the adjacent wall. Alternatively, the guide is provided by the access opening in the adjacent wall. For example, the guide may be provided by the access opening itself.

Preferably, the second housing part has a base portion, on which the second contact face is disposed, wherein a wall portion extends, substantially at right angles to the contact face, away from the base portion, which wall portion preferably provides the guide parts, in particular the guide element, disposed on the second housing part, and which wall portion preferably closes the access opening disposed in the said adjacent wall. The base portion, when in the installation position, is in contact with the surface of the photovoltaic panel, and the guide element extends parallel to the side of the photovoltaic panel.

In this embodiment, the guide element simultaneously provides the bottom of the slot. The slot is thus defined by the two contact faces and the guide element.

Preferably, each of the contact faces has a receiving region for receiving a fastening means, by which fastening means the respective housing part can be fastened and/or sealed to the corresponding surface of the photovoltaic panel, wherein the receiving region is preferably disposed in such a manner that it extends completely around the said access opening.

The fastening means has not only a sealing effect, but also an adhesive effect. The fastening means is preferably a silicone seal that is applied in a liquid state and that then hardens.

A further embodiment of the junction box housing is characterized in that the first housing part has at least one, preferably at least two, coupling points, wherein the coupling point has a connector face for receiving matching connectors. By means of the coupling points, parts of the functional elements are routed outward from the interior space and can be connected in an electrically conductive manner, in the region of the coupling points, to an electrically conductive element, such as a cable.

A further embodiment of the junction box housing is characterized in that the first housing part and the second housing part, in particular in the region of the guide, each have a stop face, which stop faces are in contact with each other upon attainment of the assembly position, with a minimum slot thickness.

A further embodiment of the junction box housing is characterized in that the first housing part and/or the second housing part have/has a fill opening, via which a sealant can be filled into the interior space, and the first housing part and/or the second housing part have/has a check window or a check opening, via which the sealant is visible, and by which the complete filling of the interior space can be indicated. The sealant may also be referred to as potting. The sealant is preferably a silicone. The check opening, in the installation position, is higher than the fill opening.

A further embodiment of the junction box housing is characterized in that some or all side walls delimiting the interior space are provided with reinforcing ribs, wherein the reinforcing ribs are preferably disposed on the outside with respect to the interior space. The reinforcing ribs have the advantage that the wall thickness can be reduced, with resistance to external influences remaining unchanged. As a result, material can be saved, and the heat can be better removed from the junction box housing.

A further embodiment of the junction box housing is characterized in that metallic cooling bodies are disposed in the interior space, wherein the metallic cooling bodies are preferably parallel to three side walls of the junction box housing. Preferably, the cooling body is realized in a U shape, and in the installation position is parallel to the two surfaces and the lateral face of the photovoltaic panel.

A photovoltaic junction box comprises a junction box housing according to the above description, and functional elements, disposed in the interior space of the junction box housing, for leading off electrical energy generated by the photovoltaic panel. The functional elements preferably comprise connecting elements, a bypass element, and connection elements, wherein the connecting elements serve to effect electrically conductive connection to the photovoltaic panel and to the bypass element, and wherein the connection elements serve to effect electrically conductive connection of the bypass element and external elements, such as cables.

The bypass element is preferably a bypass diode or a bypass switch. Preferably, the bypass element is a Schottky diode or a cool bypass switch.

The said connection elements preferably project through or into the coupling point, where they can then be contacted to external elements such as, for example, a cable or a connector.

The said connecting elements preferably project, from the interior space, out of the access opening, or are disposed in such a manner that the connecting elements are accessible through the access opening.

Preferably, each of the connecting elements has at least one contact portion, to which a connection band of the photovoltaic panel can be connected, wherein the contact portion can be moved from an assembly position into a connecting position, wherein the contact portion, in the assembly position, is oriented parallel to the said contact faces, and is thus oriented parallel to the surfaces of the photovoltaic panel. In the connecting position, the contact portion is preferably inclined at right angles to the contact faces. The contact portion is thus swiveled by 90° from an assembly position into a connecting position.

Particularly preferably, the connecting element has a bottom portion which adjoins the contact portion and via which the connecting element is seated on one of the housing parts, wherein the contact portion is connected to the bottom portion via a predetermined bending point. In addition, the predetermined bending point preferably has a through-hole. The through-hole creates a free space for routing the connection band. In particular, in the connecting position, the connection band may project partly through this through-hole.

A photovoltaic module comprises a photovoltaic panel and at least one junction box according to the above description, wherein the photovoltaic module comprises at least two carrier layers, which define the said surfaces, solar cells placed between the carrier layers, and at least one connection band that is electrically connected to the solar cells, wherein the at least one connection band, in its assembly position, is routed between these two carrier layers, parallel to the surfaces, via the lateral face of the panel, out of the carrier layers. In the region of the lateral face, the connection band will then be contacted to the corresponding functional elements in the junction box housing.

The two housing parts are preferably connected to the photovoltaic panel via an adhesive connection. The adhesive connection simultaneously provides a seal.

Preferably, the connection band routed out of the carrier layer, or carrier layers, has a beading between the lateral face and the free end. The beading is for length compensation, or strain relief, of the connection band. The beading thus makes it possible to avoid tensile forces that occur as a result of the swiveling of the contact portion.

A method for providing a photovoltaic module described above is characterized in that,
  in a first step, the first housing part is placed with its contact face on the first surface of the photovoltaic panel,
  in a second step, the at least one connection band is connected in an electrically conductive manner to at least one connecting element,
  in a third step, the connection band, with the connecting element, is bent into the interior space,
  in a fourth step, the second housing part is connected to the first housing part via the guide, and
  in a fifth step, the interior space is filled with a sealing compound.

Further embodiments are specified in the dependent claims.

BRIEF DESCRIPTION OF THE DRAWINGS

Preferred embodiments of the invention are described in the following on the basis of the drawings, which serve merely for explanation and which are not to be construed as limiting. There are shown in the drawings:

FIG. 1 a perspective view, from below, of an embodiment of a junction box housing connected to a photovoltaic panel;

FIG. 2 the junction box housing according to FIG. 1, on a photovoltaic panel of a thinner design;

FIG. 7 a perspective view of the junction box housing according to FIG. 1, with separated housing parts;

FIG. 8 a perspective view of the junction box housing according to FIG. 1, with separated housing parts;

FIG. 10 a sectional representation through the junction box housing, in the assembly position and the connecting position; and FIG. 11 a sectional representation through the junction box housing, in the assembly position and the connecting position.

DESCRIPTION OF THE INVENTION

Figure 3:
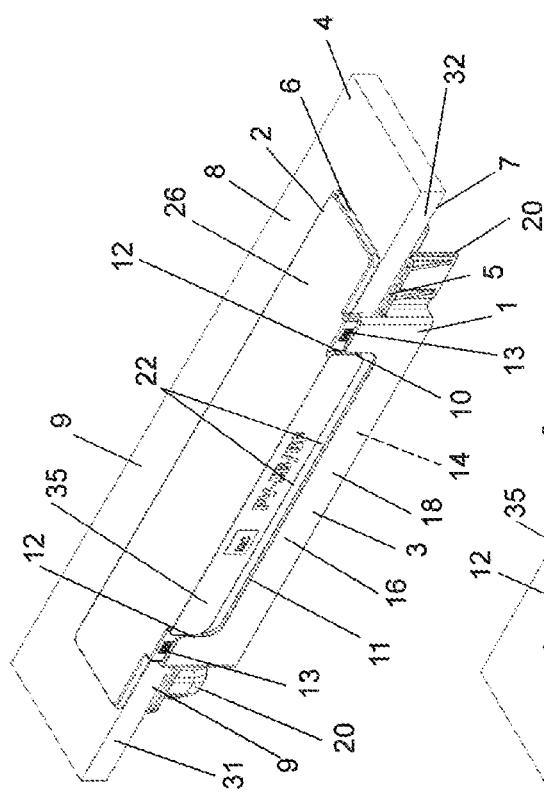
FIG. 3 the configuration according to FIG. 1, from above.
Figure 4:
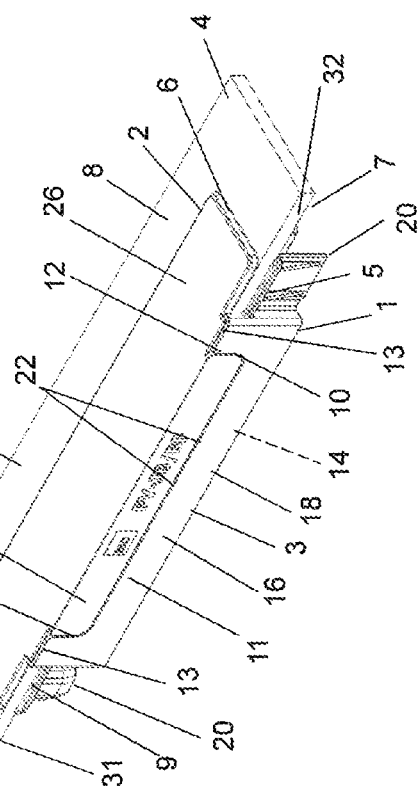
FIG. 4 the configuration according to FIG. 2, from above.

A preferred embodiment of a junction box housing 3 for a photovoltaic panel 4 is shown in FIGS. 1 to 11. The junction box housing 3 comprises a first housing part 1 and a second housing part 2. With these two housing parts 1 and 2, the junction box housing 3 surrounds an edge region of the photovoltaic panel 4. The junction box housing 3 in this case is in contact with a first surface 7 of the photovoltaic panel 4 by means of the first housing part 1, and with a second surface 8 of the photovoltaic panel 4 by means of the second housing part 2. Further, the junction box housing 3 is in contact with the lateral face 32 of the photovoltaic panel 4, which connects the first surface 7 and the second surface 8, by means of the first housing part 1 and/or by means of the second housing part 2. Thus, in the embodiment shown in the present case, the junction box housing 3 is realized substantially in the form of a clamp, and receives parts of the photovoltaic panel 4 via a slot 9. The slot 9 is provided by the two housing parts 1, 2.

The first housing part 1 has a first contact face 5. The surface 7 of the photovoltaic panel 4 can be directly or indirectly contacted via the first contact face 5. The first housing part 1 can thus be disposed directly or indirectly on the surface 7 via this first contact face 5. The second housing part 2 has a second contact face 6. The surface 8 of the photovoltaic panel 4 can be directly or indirectly contacted via the second contact face 6. The second housing part 1 can thus be disposed directly or indirectly on the surface 8 via this second contact face 6. In the case of direct contacting, the contact faces 5, 6 are directly in contact with the corresponding surface 7, 8. In the case of indirect contacting, the contact faces 5, 6 are in contact with the respective surface 7, 8 via a further element such as, for example, a seal or a spacer.

Figure 5:
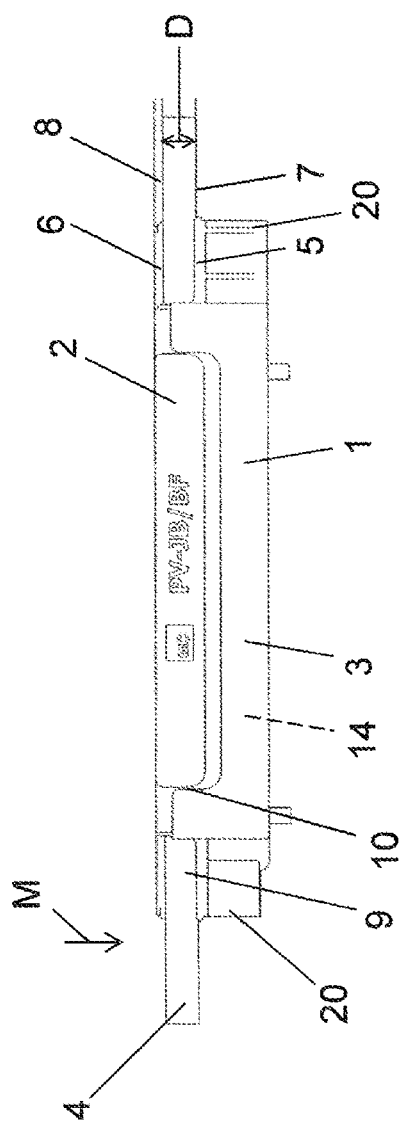
FIG. 5 the configuration according to FIG. 1, from the side.
Figure 6:
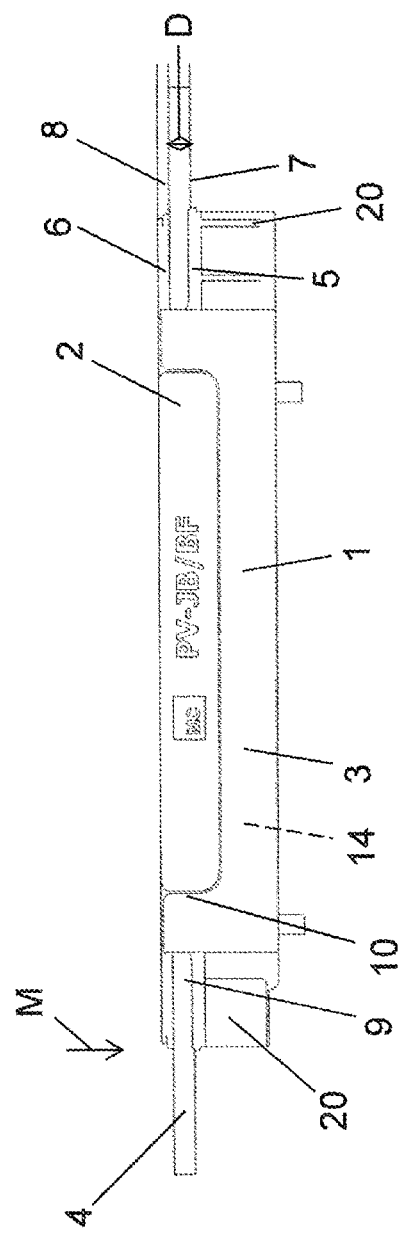
FIG. 6 the configuration according to FIG. 2, from the side.

The first contact face 5 is spaced apart from the second contact face 6, such that a slot 9, for receiving the photovoltaic panel 4, is provided, or defined, by the first contact face 5 and the second contact face 6. The two housing parts 1, 2 are connected to each other via at least one guide 10. By means of this guide 10, the two housing parts 1, 2 are displaceable relative to each other, along an assembly movement M. This displaceability enables the thickness D of the slot 9 to be adjusted. The thickness D of the slot 9 can thus be adjusted to the thickness of the photovoltaic panel 4. This is shown clearly by FIGS. 1 to 6. FIGS. 1, 3 and 5 show a photovoltaic panel 4 of a thickness greater than that of FIGS. 2, 4 and 6. Both the thick photovoltaic panel 4 and the thin photovoltaic panel 4 are connected to the same junction box 3. Thus, owing to the guide 10 between the two housing parts 1 and 2, the junction box housing 3 can be adapted to photovoltaic panels 4 of differing thickness.

The said assembly movement M is inclined at an angle, in particular at right angles, to the said contact faces 5, 6 of the two housing parts 1, 2. In other words, the assembly movement is inclined at an angle, in particular at right angles, to the said surfaces 7, 8 of the photovoltaic panel 4.

Figure 9:
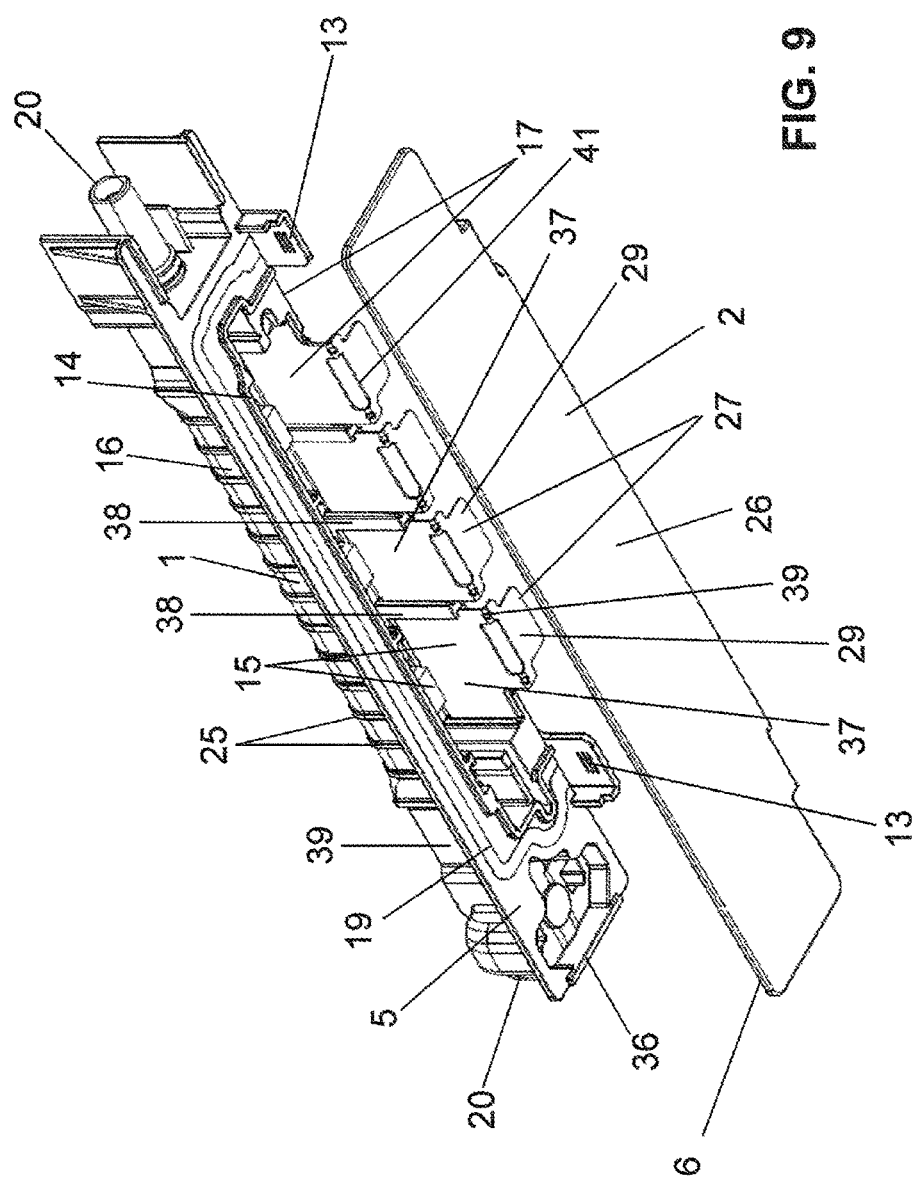
FIG. 9 a perspective view of the junction box housing according to FIG. 1, with separated housing parts.

FIGS. 7 to 9 show the two housing parts 1, 2 separated from each other. Specific features of the junction box housing 3 according to the present embodiment are now explained in greater detail on the basis of these illustrations.

The guide 10 between the first housing part 1 and the second housing part 2 comprises at least one guide receiver 11 and at least one guide element 12. The guide element 12 cooperates with the guide receiver 11. In the embodiment shown, the guide receiver 11 is disposed on the first housing part 1, and the guide element is disposed on the second housing part 2. A converse disposition is also conceivable. In the embodiment shown, the guide receiver 11 is provided by a recess on the first housing part 1. The guide element 12 projects into this recess and is movable therein. The guide element 12 here is realized as a flat plate that, in respect of its shape, corresponds to the said recess. The guide receiver 11 and the guide element 12 have mutually corresponding shapes. Other realizations of the guide 10, e.g. a bushing-pin connection, are likewise conceivable.

The guide element 12 projects into the guide receiver 11, and is mounted so as to be displaceable in the latter, along the assembly movement M. The two housing parts 1, 2 are thus displaceable relative to each other via the pairing guide element 12 and guide receiver 11.

In the embodiment shown, the two housing parts 1, 2 comprise latching elements 13, in the region of the guide 10. In this case, the latching elements 13 on the guide receiver 11 cooperate with latching elements on the guide element 12. Particularly preferably, a plurality of latching elements 13 are disposed such that they are spaced apart from one another in the direction of the assembly movement. Thus, during assembly, a defined movement can be effected with defined intervals. Particularly preferably, the latching elements are disposed at regular intervals in relation to one another. In the embodiment shown, two pairings of latching elements 13 are disposed on the left and right on the guide. In respect of the guide 10, therefore, the disposition of the latching elements 13 is substantially symmetrical, this being advantageous for the behavior of the guide 10 during assembly.

In the embodiment shown, the first housing part 1 comprises an interior space 14 delimited by a wall 16. The interior space 14 serves to receive functional elements 15. The functional elements 15 are, for example, electrical conducting elements, such as a bypass element and electrical conductors. A concrete example is described below. In the embodiment shown, the wall 16 provides the first contact face 5. From this contact face 5, the wall 16 then extends with a side wall 34 at right angles to the contact face 5 and defines the interior space 16, above the contact face 5. In other words, the said side wall 34 extends from the contact face 5, the side wall 34 being closed with respect to the contact face 5 by a closing wall 33. The contact face 5, side wall 34 and the closing wall 33 in this case define the interior space 14. In the region of the first contact face 5, the first housing part 1 comprises an access opening 17. The interior space 14 is accessible via this access opening 17.

The access opening 17 is not only disposed in the region of the first contact face 5, however, but extends partly into a wall 18 that is adjacent to the first contact face 5. In the embodiment shown, the access opening extends into the side wall 34.

In the embodiment shown, the first housing part 1 extends, by the wall 18, into the lateral face 31 of the photovoltaic module, as a result of which the access opening also extends into the region of the lateral face 31. As a result, connecting elements 27, to which connection bands 30 of the photovoltaic module are to be connected, are contacted in an effective manner in the region of the lateral face 31.

The interior space 14 can be accessed from the outside via the access opening 17. This means that, during assembly, manipulations can be performed inside the junction box housing 3, in this case inside the first housing part 1, via the access opening 17. Following completion of manipulations, the access opening 17 is closed outwardly. In the present embodiment, the access opening 17 is closed by the second housing part 2 and by the surface 7 of the photovoltaic panel 4. Thus, in the installation position, the parts of the access opening 17 are located on the surface 7 of the photovoltaic panel 4, and the parts of the access opening that are disposed in the adjacent wall 18 are closed by the second housing part 2. This is shown clearly in FIGS. 1 to 4. In other embodiments, the access opening may also be closed only by parts of the second housing part 2.

In the shown first housing part 1, the interior space 14 is disposed in such a manner that it comes to lie substantially above the surface of the photovoltaic panel 4.

From viewing FIG. 7, it can be stated that the second housing part 2 is pushed from underneath in the direction of the first housing part 1 that is already in contact with the first contact face 5. As a result of this, the second housing part 2 can be pushed into the first housing part 1. The two housing parts 1, 2 in this case are connected to each other via the guide 10. The second housing part 2 is then pushed into the first housing part until the contact face 6 of the second housing part 2 comes into contact with the second surface 8 of the photovoltaic panel 4. The slot between the two contact faces 4, 5 is thus automatically adapted to the thickness of the photovoltaic panel 4.

With respect to the access opening 17, the guide, with the guide receiver 11 and the guide element 12, is placed in the region of the access opening 17, which is disposed in the adjacent wall 18. However, the guide may also be provided by the access opening 17 itself. For example, the access opening 17 could have corresponding guide elements in the region of the adjacent wall.

In the embodiment shown, the second housing 2 has a base portion 26, at which the second contact face 6 is disposed. Unlike the design of the first housing part 1, the second housing part 2 does not have an interior space. A wall portion 35 extends from the base portion 26. The base portion 26, or the second contact face 6, is substantially at right angles to the wall portion 35.

As viewed in the transverse direction, the second housing part 2 is realized substantially in an L shape. The wall portion 35 provides the guide parts, in particular the guide element 12, disposed on the second housing part 2. In the connected state, the wall portion 35 additionally closes off the access opening 17, which is disposed in the adjacent wall 18, such that the interior space is no longer accessible via the said access opening 17. In other words, the wall portion 35 provides a wall region for the interior space 14 in the first housing part 1. The wall portion can therefore also be referred to as a cover.

It can additionally be seen from FIG. 7 that, at the side of the access opening 17, the first housing part 1 extends sectionally, by a wall region 42, along the lateral face 31 of the photovoltaic panel 4. Here, the wall region 42 bears, by a front edge, against the first housing part, and is otherwise spaced apart from the lateral face 31. The free space produced as a result is part of the receiving space 11.

FIGS. 8 and 9 show clearly that each of the contact faces 5, 6 has a receiving region 19 for receiving a fastening means. The fastening means serves to fasten the corresponding housing parts 1, 2 and/or to seal a gap between the two contact faces 5, 6 and the two surfaces 7, 8 of the photovoltaic panel 4. However, the fastening means also provides a materially bonded connection between the first housing part 1 and the first surface 5 of the photovoltaic panel 4, and the second housing part 2 and the second surface 8 of the photovoltaic panel 4. A silicone seal is preferably used as a fastening means. The receiving region 19, on which the fastening means is placed, is preferably disposed in such a manner that it extends completely around the said access opening 17. The said access opening 17 is thus sealed off outwardly. The fastening means serves for indirect disposition.

In the embodiment shown, each of the two contact faces 5, 6 comprises spacing elements 36 that extend away from the contact faces 5, 6. These spacing elements 36 in this case are parts of the contact face 5, 6, and the junction box housing 3 is in contact with the photovoltaic panel 4 via these spacing elements 36. Although the spacing elements 36 are preferred, they are optional.

Further features of the junction box housing according to the invention are now explained with reference to all FIGS. 1 to 9.

Here, the first housing part 1 has two coupling points 20. The coupling points 20 each have a connector face 21. The coupling point 20, with the connector face 21, is designed to receive matching connectors. Thus, via the coupling point 20, a cable having a matching connector can be connected to the junction box housing 3 and to the functional elements disposed in the interior space 14.

Further, the first housing part 1 and the second housing part 2, in particular in the region of the guide 10, each have a stop face 22. A minimum slot thickness can be defined by means of this stop face 22.

The first housing part 1 additionally has a fill opening 23. Via the fill opening 23, a sealant can be filled into the interior space 14. The sealant is filled into the interior space 14 following assembly of the junction box housing 3 and following connection of the functional elements 15. The sealant may also be referred to as potting. The sealant, or potting, additionally serves as a thermal conductor. Further, the first housing part 1 has a check window 24. Via the check window 24 it is possible to check, during or after filling of the sealant, whether the sealant has completely filled the interior space 14. Via the check window, which may be a simple opening, it is thus possible to check whether the interior space 14 has been completely filled with the sealant. The check window additionally serves for venting during the filling operation.

Further, in this case some side walls that delimit the interior space, in particular the closing wall 33 and parts of the side walls 34, have reinforcing ribs 25. Here, the reinforcing ribs 25 are disposed on the outside of the respective wall, and are in the form of a comb. By means of these reinforcing ribs 25, the corresponding wall can be reinforced in respect of impacts. In addition, the wall can be made thinner, its strength remaining unchanged, thereby providing for better removal of the heat.

Furthermore, metallic cooling bodies may be disposed in the interior space 14. The metallic cooling bodies in this case extend preferably parallel to three walls 16 of the junction box housing 3, and are disposed such that they are oriented substantially parallel to the first surface 7 and to the second surface 8, and to the lateral face 32 of the photovoltaic panel 4. Waste heat from the functional elements 15 can be removed easily via such a cooling body.

A photovoltaic junction box, having a junction box housing 3 according to the above description, comprises functional elements 15 in the interior space 14 of the junction box housing 3. The functional elements serve to lead off electrical energy generated by the photovoltaic panel 2. The functional elements preferably comprise connecting elements 27, a bypass element and connection elements 28. The connecting elements 27 serve substantially to effect electrically conductive connection to the photovoltaic panel 2 and to the bypass element. The function of the bypass element, which may also be referred to as a free-wheeling element, is known from the prior art. Further, the bypass element is then electrically connected to external elements via the connection elements 28. Here, the connection elements 28 project into or through the coupling point 20, out of the interior space 14. In this case, an electrical contact is made to a cable or to a connector, in the region of the coupling point 20.

The extent of the first housing part 1 and second housing part 2, as viewed in a direction at right angles to the contact faces 4, 5, is substantially the same for both housing parts 1, 2. In other words, the two contact faces 4, 5 are substantially of the same size.

As shown in FIGS. 9 to 11, the connecting elements 27 comprise at least one contact portion 29. The contact portion 29 can be connected to a connection band 30 of the photovoltaic panel 4. The contact portion 29, when in an assembly position that is shown at the extreme left in FIG. 10, is parallel to the said contact faces 5, 6, or to the surfaces 7, 8 of the photovoltaic panel 4. As soon as the contact portion 29 is connected in an electrically conductive manner to the connection band 30 of the photovoltaic panel 4, the contact portion 29 is bent over. This is represented in the two illustrations on the right in FIG. 10. Here, the contact portion 29 and also the connection band 30 are oriented at right angles to the said contact faces 5, 6.

Further, the connecting element 27 here comprises a bottom portion 37 that adjoins the contact portion 29. The contact portion 29 can be swiveled, from the assembly position into the connecting position, to this bottom portion 37. Here, the bottom portion 37 projects into the interior space 14, where it is connected to the first housing part 1 by means of corresponding bearing points 38. A predetermined bending point 39 is disposed in the transition region between the bottom portion 37 and the contact portion 29. This predetermined bending point 39 acts as a hinge between the contact portion 29 and the bottom portion 37, such that the contact portion 29 can be swiveled to the fixed bottom portion 37. The predetermined bending point 39 may be disposed, for example, with one or more through-holes, in the transition region between the bottom portion 37 and the contact portion 29.

In the assembly position, the connecting element 27 is located in such a manner that the connecting element 27 extends beyond the contact face 5, such that the connecting element 27 is located in the region of the lateral face 32 when the first housing part lies on the photovoltaic module 4.

For the connecting operation and the subsequent swiveling operation with the contact portion 29, it is additionally advantageous if the connection band 30 is also made in a corresponding manner. It is shown clearly in FIG. 7 that the connection band 30 has a beading 40 in the region of the lateral face 32. This beading 40 acts in the same way as the predetermined bending point 39. The beading 40 has the advantage that there is less loading of the connection band 30. The action of the beading 40 is additionally shown clearly in FIGS. 10 and 11. In the case of a comparatively thin photovoltaic panel 4, as shown in FIG. 10, the connection band can easily be pressed back down by the bottom portion 37, which can then be compensated by the beading 40. Equally, in the case of a comparatively thick photovoltaic panel 4, such as that shown in FIG. 11, the distance between the contact portion 29 and the point at which the connection band 30 emerges from the photovoltaic panel 4 can be easily compensated by the beading 40.

The swiveling operation may be effected by a separate tool, such as a robot, or by the second housing part 2, in particular by the side wall 34.

Preferably, the bottom portion 37 bears against the lateral face 32 by its side that faces toward the photovoltaic panel.

In width, the connection band 30 is preferably less wide than the contact portion 29. As can be seen in the detail X of FIG. 10, the connection band 30 is preferably routed through an exposed region in the region of the predetermined ending point 39. This exposed region is created by a through-hole or an opening in the region of the predetermined bending point 39.

The photovoltaic module shown in the figures comprises a photovoltaic panel 4 and at least one junction box, having a junction box housing 3 and corresponding functional elements. In the embodiment shown of FIGS. 10 and 11, the photovoltaic panel 4 comprises at least two carrier layers 31, which define the said surfaces 7, 8, solar cells placed between the carrier layers 31, and at least one connection band 30 that is electrically connected to the solar cells. The connection band 30 projects, over the lateral face 32, from the photovoltaic panel 4. The at least one connection band 30, in its assembly position, is routed between these two carrier layers 31, parallel to the surfaces, out of the carrier layers 31. However, the photovoltaic panel 4 may also be of a different design.

A method for assembly a photovoltaic module is characterized in that,
- in a first step, the first housing part 1 is placed with its contact face 5 on the first surface 7 of the photovoltaic panel 4,
- in a second step, the at least one connection band 30 is connected in an electrically conductive manner to at least one connecting element 27,
- in a third step, the connection band 3, with the connecting element 27, is bent into the interior space 14,
- in a fourth step, the second housing part 2 is connected to the first housing part 1 via the guide 10, and
- in a fifth step, the interior space 14 is filled with a sealing compound.

In a preferred embodiment, before the first step and the fourth step, the respective housing part 1, 2 or the surface of the photovoltaic panel 4, in the region where the housing parts 1, 2 come to lie, is provided with a sealant that provides a materially bonded connection between the housing parts 1, 2 and the photovoltaic panel 4.

LIST OF REFERENCES 1 first housing part
2 second housing part
3 junction box housing
4 photovoltaic panel
5 first contact face
6 second contact face
7 first surface
8 second surface
9 slot
10 guide
11 guide receiver
12 guide element
13 latching elements
14 interior space
15 functional elements
16 wall
17 access opening
18 adjacent side wall
19 receiving region
20 coupling point
21 connector face
22 stop face
23 fill opening
24 check opening
25 reinforcing ribs
26 base portion
27 connecting elements
28 connection elements
29 contact portion
30 connection band
31 carrier layer
32 lateral face
33 closing wall
34 side wall
35 wall portion
36 spacing elements
37 bottom portion
38 bearing points
39 predetermined bending point
40 beading
41 through-hole
42 wall region
M assembly movement
D thickness

The invention claimed is:

1. A junction box housing for a photovoltaic panel, having a first housing part and a second housing part,
   wherein the first housing part has a first contact face by means of which the first housing part can be disposed directly or indirectly on a first surface of the photovoltaic panel, and wherein the second housing part has a second contact face by means of which the second housing part can be disposed directly or indirectly on a second surface of the photovoltaic panel,
   wherein the first contact face is spaced apart from the second contact face, such that a slot for receiving the photovoltaic panel is provided by the first contact face and the second contact face, and
   wherein the first housing part and the second housing part are connected to each other via at least one guide, and are designed to be displaceable relative to each other, guided by the guide, along an assembly movement, such that a thickness of the slot is adjustable to a thickness of the photovoltaic panel, and
   wherein the photovoltaic panel is directly or indirectly contacted by the first and second contact faces.

2. The junction box housing as claimed in claim 1, wherein the assembly movement is inclined at an angle, in particular at right angles, to the said contact faces or the said surfaces.

3. The junction box housing as claimed in claim 1, wherein the guide comprises at least one guide receiver, disposed on one of the housing parts, and at least one guide element, disposed on the other of the housing parts, wherein the guide element projects into the guide receiver and is mounted in the latter so as to be displaceable along the assembly movement.

4. The junction box housing as claimed in claim 1, wherein the guide comprises at least one guide receiver, disposed on one of the housing parts, and at least one guide element, disposed on the other of the housing parts, wherein the guide element projects into the guide receiver and is mounted in the latter so as to be displaceable along the assembly movement, and wherein the guide receiver and the guide element are inclined at an angle, in particular at right angles, to the respective contact face.

5. The junction box housing as claimed in claim 1, wherein the housing parts, in particular in a region of the guide, have latching elements that cooperate with each other, wherein preferably a plurality of latching elements are disposed such that they are spaced apart, in particular with regular intervals in relation to one another.

6. The junction box housing as claimed in claim 1, wherein the first housing part comprises an interior space, delimited by a wall, for receiving functional elements, wherein the wall provides the first contact face and has an access opening in a region of the first contact face.

7. The junction box housing as claimed in claim 1, wherein the first housing part comprises an interior space, delimited by a wall, for receiving functional elements, wherein the wall provides the first contact face and has an access opening in a region of the first contact face, and wherein the access opening extends into the wall disposed adjacently to the first contact face.

8. The junction box housing as claimed in claim 7, wherein the first contact face defines a plane, wherein parts of the access opening in said plane are oriented in relation to the first surface of the photovoltaic panel in an installation position, and parts of the access opening in the wall disposed adjacently to the first contact face are closed off by the second housing part.

9. The junction box housing as claimed in claim 7, wherein the guide is disposed in the region of the access opening in the adjacent wall or is provided by the access opening in the adjacent wall.

10. The junction box housing as claimed in claim 1, wherein the second housing part has a base portion, on which the second contact face is disposed, wherein a wall portion extends, substantially at right angles to the contact face, away from the base portion.

11. The junction box housing as claimed in claim 6, wherein each of the contact faces has a receiving region for receiving a fastening means, by which fastening means the respective housing part can be at least one of fastened and sealed to the corresponding surface of the photovoltaic panel, wherein the receiving region is preferably disposed in such a manner that it extends completely around said access opening.

12. The junction box housing as claimed in claim 6, wherein at least one of:
a bottom of the slot is provided by at least one of the first housing part and the second housing part, wherein a lateral face of the photovoltaic module is connectable to the bottom of the slot;
and
the first housing part has at least one, preferably at least two, coupling points, wherein the coupling point has a connector face for receiving matching connectors,
and
the first housing part and the second housing part, in particular in the region of the guide, each have a stop face, which stop faces are in contact with each other upon attainment of an assembly position, with a minimum slot thickness,
and
at least one of the first housing part and the second housing part has a fill opening, via which a sealant can be filled into the interior space, and at least one of the first housing part and the second housing part has a check window or a check opening, via which the sealant is visible, and by which the complete filling of the interior space can be indicated,
and
some or all side walls delimiting the interior space are provided with reinforcing ribs, wherein the reinforcing ribs are preferably disposed on the outside with respect to the interior space,
and
metallic cooling bodies are disposed in the interior space, wherein the metallic cooling bodies are preferably parallel to three side walls of the junction box housing,
and
at the side of the access opening the first housing part extends sectionally, by a wall region, along the lateral face of the photovoltaic panel, wherein the wall region preferably bears, by a front edge, against the first housing part, and is otherwise spaced apart from the lateral face, such that a free space produced as a result is part of the receiving space.

13. A photovoltaic junction box, comprising a junction box housing as claimed in claim 1, and functional elements, disposed in an interior space of the junction box housing, for leading off electrical energy generated by the photovoltaic panel, wherein the functional elements preferably comprise connecting elements, at least one bypass element, and connection elements, wherein the connecting elements serve to effect electrically conductive connection to the photovoltaic panel and to the bypass element, and wherein the connection elements serve to effect electrically conductive connection of the bypass element and external elements, such as cables.

14. The photovoltaic junction box as claimed in claim 13, wherein each of the connecting elements has at least one contact portion, to which a connection band of the photovoltaic panel can be connected, wherein the contact portion can be moved from an assembly position into a connecting position, wherein the contact portion, in the assembly position, is oriented parallel to said contact faces, and is thus oriented parallel to the surfaces of the photovoltaic panel.

15. The photovoltaic junction box as claimed in claim 14, wherein, in the assembly position, the connecting elements project, by the contact portion, out of the interior space and, in the connecting position, project into the interior space.

16. The photovoltaic junction box as claimed in claim 14, wherein the connecting element has a bottom portion which adjoins the contact portion and via which the connecting element is seated on one of the housing parts, wherein the contact portion is connected to the bottom portion via a predetermined bending point, wherein a through-hole is arranged in a region of the predetermined bending point.

17. A photovoltaic module, comprising a photovoltaic panel and at least one junction box as claimed in claim 13, wherein the photovoltaic module comprises at least two carrier layers, which define said surfaces, solar cells placed between the carrier layers, and at least one connection band that is electrically connected to the solar cells, wherein the at least one connection band, in its assembly position, is routed between these two carrier layers, parallel to the surfaces, out of the carrier layers, wherein the connection band routed out of the carrier layers has a beading between the lateral face and the free end.

18. A method for providing a photovoltaic module as claimed in claim 17, wherein,
- in a first step, the first housing part is placed with its contact face on the first surface of the photovoltaic panel,
- in a second step, the at least one connection band is connected in an electrically conductive manner to at least one connecting element,
- in a third step, the connection band, with the connecting element, is bent into the interior space,
- in a fourth step, the second housing part is connected to the first housing part via the guide, and
- in a fifth step, the interior space is filled with a sealing compound.

19. The junction box housing as claimed in claim 10, wherein the wall portion at least one of provides the guide parts and closes the access opening disposed in said adjacent wall.

20. The junction box housing as claimed in claim 19, wherein the wall portion provides the guide element.

* * * * *